April 17, 1956 L. E. ELFES 2,741,889
MOWER BREAKBACK RELEASE MECHANISM
Filed Aug. 5, 1954 3 Sheets-Sheet 2
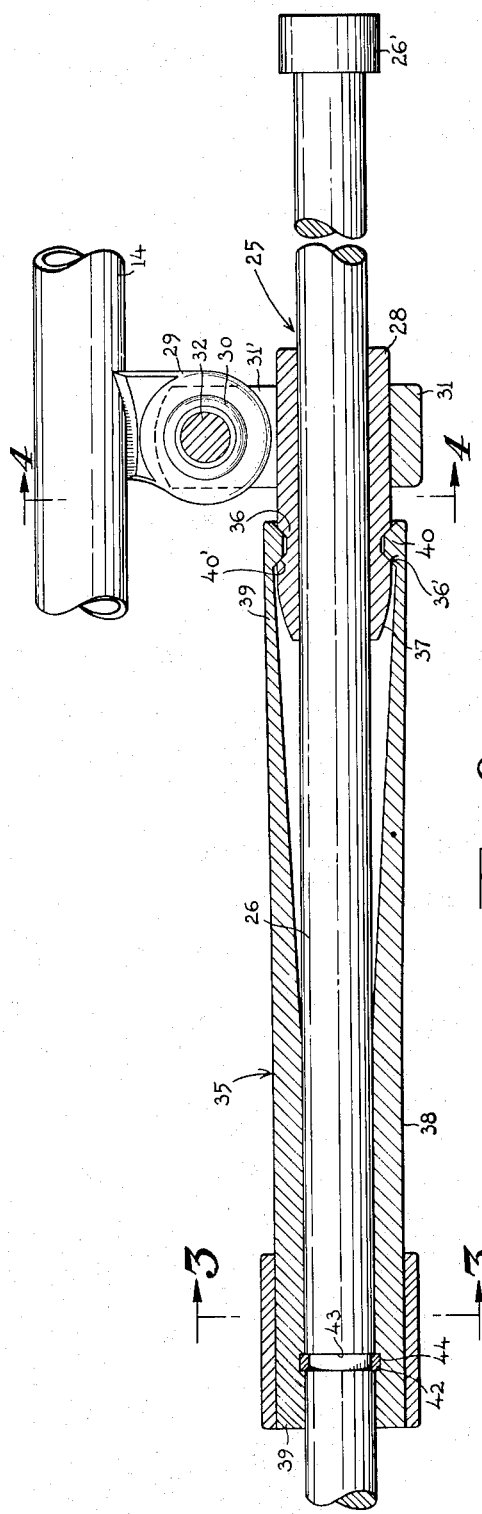
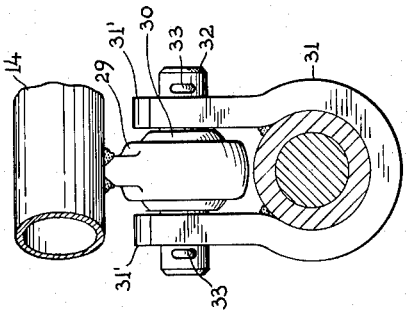
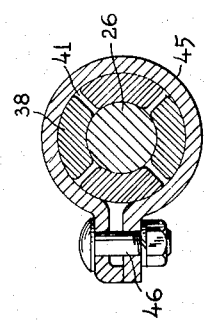
INVENTOR.
Lee E. Elfes
BY
Carlsen, Pitzner, Hubbard & Wolfe
Attorneys April 17, 1956  L. E. ELFES  2,741,889
MOWER BREAKBACK RELEASE MECHANISM
Filed Aug. 5, 1954  3 Sheets-Sheet 3
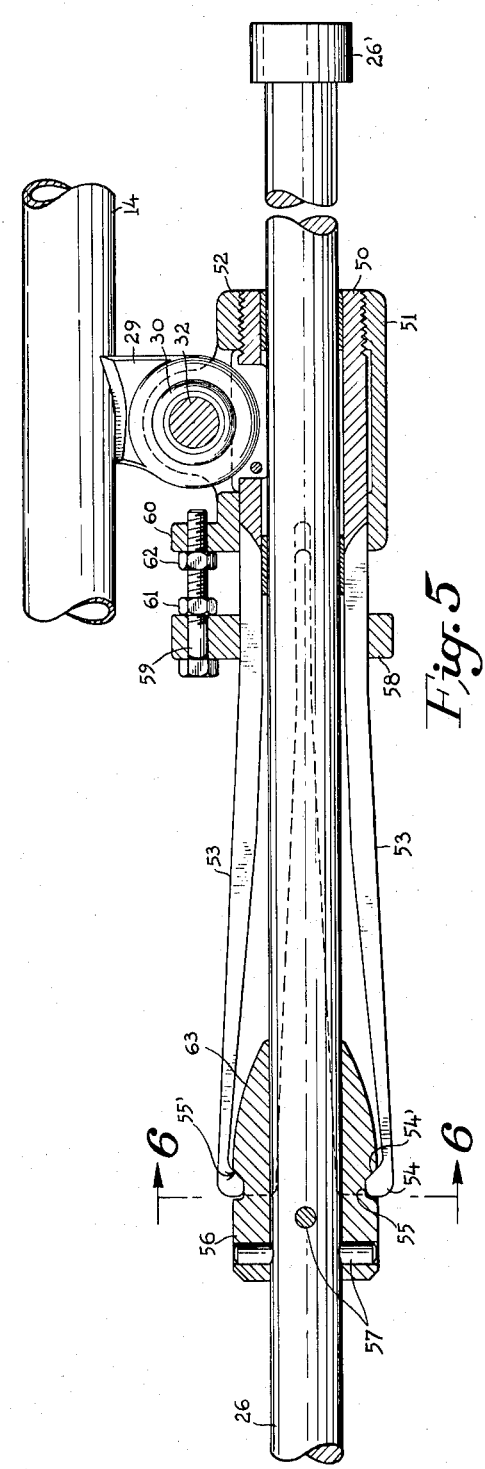
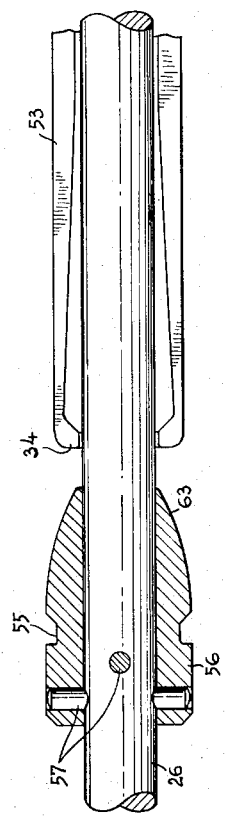
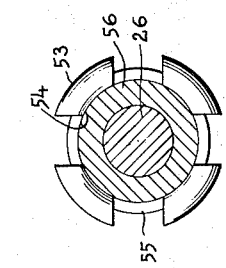
INVENTOR.
Lee E. Elfes
BY
Carson, Pigner, Hubbard & Wolfe
Attorneys

United States Patent Office 2,741,889
Patented Apr. 17, 1956

2,741,889

MOWER BREAKBACK RELEASE MECHANISM

Lee E. Elfes, Birmingham, Mich., assignor to Harry Ferguson, Inc., Detroit, Mich., a corporation of Delaware Application August 5, 1954, Serial No. 448,022

7 Claims. (Cl. 56—25)

This invention relates to mowers generally and in particular to improved releasable tension mechanism for holding the mower cutter bar in working position under normal operating conditions and operative to release it for rearward swing when the drag load on the bar becomes excessive as when it strikes an obstruction.

One object of the invention is to provide releasable tension mechanism which is simple in construction, adapted for production by low cost manufacturing methods, and yet thoroughly reliable in operation.

Another object is to provide releasable tension mechanism which is easy to install and which is readily adjustable with respect to the drag load required to effect release of the cutter bar.

Other objects and advantages of the invention will become apparent from the following detailed description of the preferred embodiments illustrated in the accompanying drawings in which Figure 1 is a plan view of a tractor mounted mower equipped with releasable tension mechanism embodying the features of the invention.

Fig. 2 is an enlarged longitudinal sectional view of the pull bar and latch means forming parts of the mechanism taken along the line 2—2 of Fig. 1.

Fig. 3 is a sectional view taken in a plane substantially on the line 3—3 of Fig. 2.

Fig. 4 is a sectional view taken in a plane substantially on the line 4—4 of Fig. 2.

Fig. 5 is a longitudinal sectional view of a modified form of latch incorporated in the tension mechanism.

Fig. 6 is a sectional view taken in a vertical plane substantially on the line 6—6 of Fig. 5.

Fig. 7 is a fragmentary sectional view showing the latch in released condition.

Figure 1:
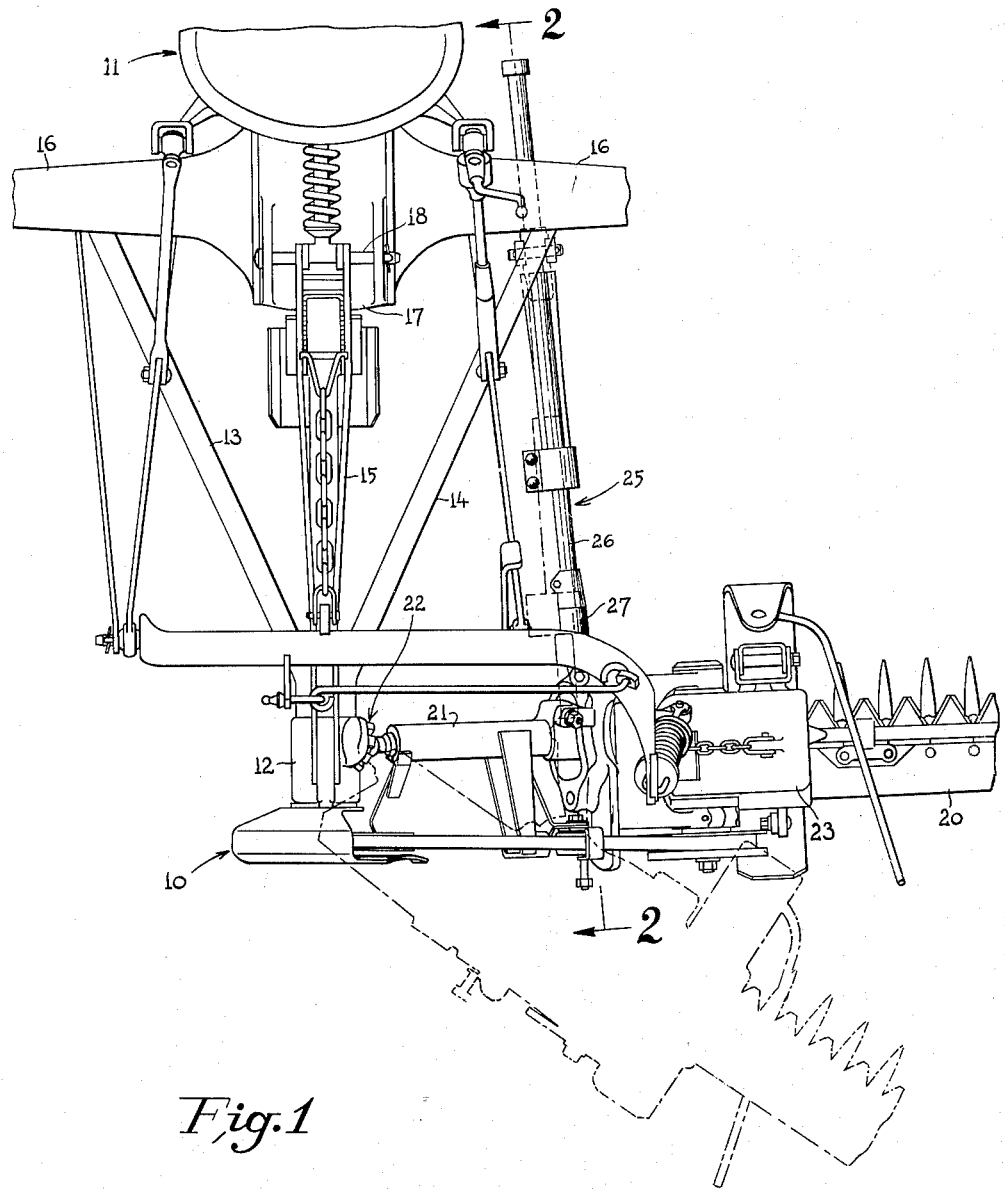

While the invention is susceptible of various modifications and alternative constructions, there is shown in the drawings and will be described herein in detail a preferred embodiment and a modification thereof. It is to be understood, however, that it is not intended thereby to limit the invention to the particular forms disclosed but the intension is to cover all modifications and alternative constructions falling within the spirit and scope of the invention as expressed in the appended claims.

The invention while adapted for use with various types of mowers and comparable implements having a swingable part requiring release under excessive loads, is particularly well suited for use with mowers of the type adapted to be mounted at the rear of a tractor. For purposes of illustration, it has therefore been show as incorporated in a mower 10 of the type designed for mounting on a tractor 11 which will be recognized as a "Ferguson" tractor. The exemplary mower includes a housing 12 supported on the tractor by means of a tripod frame structure including a pair of forwardly diverging, generally horizontal lower legs 13 and 14 and an upwardly inclined upper leg 15. The lower legs are detachably secured at their forward ends to a suitable portion of the tractor, such as the rear axle housing 16, and the upper leg which comprises a pair of generally parallel links is secured to the tractor center housing 17 as by a pin 18 inserted through lugs conventionally provided on the housing.

The mower 10 is equipped with a cutter bar 20 supported from the housing 12 by a drag bar 21. In the exemplary mower, the drag bar has a ball and socket connection 22 with the housing which permits the entire assembly to swing upwardly for transport and rearwardly to the position shown in broken lines in Fig. 1 for breakback. A driving head 23 pivotally supported at the lower end of the drag bar serves to drive the cutter bar.

In the operation of the mower, the drag bar and the elements assembled with it occupy the forward or operating position, shown in full lines in Fig. 1, with the cutter bar 20 extending laterally of the tractor. The assembly is normally retained in that position by releasable tension mechanism 25 including an extensible pull bar 26 constructed and arranged to release the assembly when the drag load on the cutter bar exceeds a predetermined value. Thus, when the cutter bar meets an obstruction, it is freed to swing rearwardly to the breakback position shown in broken lines so that damage to the bar or associated parts of the mower is avoided.

The improved releasable tension mechanism 25 provided by the invention is efficient and dependable in operation and is capable of being produced economically by low cost manufacturing methods. In the preferred form shown in Figs. 2, 3 and 4 of the drawings, the pull bar 26 of the mechanism is adapted to be anchored at its rear end to the lower portion of the drag bar 21 as by a swivel-coupling element 27. The bar extends forwardly and is slidably received in a tubular member or sleeve 28 which may be mounted on the tractor or preferably on a stationary part of the mower frame, such as the tripod leg 14. A head 26′ formed on or rigidly secured to the forward end of the bar 26, prevents it from being accidentally withdrawn from the sleeve and limits the rearward swinging movement of the cutter bar assembly.

Preferably, the sleeve 28 is mounted for universal pivotal movement to accommodate the movement of the pull bar 26 in the vertical and rearward swinging of the cutter bar assembly. As shown, the mounting of the sleeve is effected through the medium of a socket element 29 welded or otherwise rigidly attached to the frame member 14 and journalling an apertured ball element 30. A U-shaped bracket 31 welded or otherwise attached to the sleeve has spaced arms 31′ adapted to embrace the ball element and apertured for the reception of a pin 32 extending through the apertured ball. Cotter pins 33 or the like retain the pin in place.

The sleeve 28 constitutes one element of a latch, the companion element 35 of which is carried by the pull bar 26 and which cooperate to releasably retain the bar and sleeve in predetermined fixed relation. In this particular embodiment, the sleeve is formed with a circumferential groove 36 engageable by the companion element and the nose portion 37 of the sleeve is tapered to permit engagement of the elements by relative longitudinal movement.

The latch element 35 in its preferred form comprises a group of resilient metal strips or fingers 38 arranged in a circular pattern coaxial with the bar 26 and with the strips disposed substantially parallel to the axis of the bar. Each of the fingers is anchored at one end to the bar with its free or flexible end extending in the direction of the sleeve 28 and adapted to slide over the latter in telescoping relation.

The fingers 38 are all of similar construction, each comprising a base portion 39 of substantially uniform thickness. This base portion is segmental in cross section and dimensioned to fit snugly against the peripheral surface of the bar 26. Beginning substantially midway of its ends, each finger 38 is tapered gradually to form a resilient tongue portion 39. Adjacent its free end, the tongue portion is formed with an enlargement or inwardly projecting lug 40 complementally shaped with respect to the groove 36 and adapted to engage therein. As shown in Fig. 2, the rear wall of the groove 36 is shaped to define a cam surface 36' inclined at an angle to the axis of the bar 26. Similarly, the lug 40 is formed to define an inclined cam surface 40' adapted to engage the wall 36'. The angular disposition of the cam surfaces coupled with the resistance of the fingers 38 to deflection from the positions in which they are shown in Fig. 2, determines the resistance of the latch mechanism to disengagement by tension forces applied to the pull bar 26.

In the exemplary embodiment, four of the fingers 38 are provided and their base portions are dimensioned so that, when assembled with intervening separators or spacers 41, they completely encircle the bar 26 and fit snugly against it. The fingers are securely anchored to the rod for movement with it as a unit by a locking ring 42 engaging in complemental circumferential slots 43 and 44 formed in the adjacent portions of the bar and the fingers. A split clamping sleeve 45 encircling the finger assembly and adapted to be drawn tight by suitable clamping bolts 46 serves to retain the finger assembly in place on the pull bar.

In the manufacture of the tension mechanism, the fingers 38 with their lugs 40 and the groove 36 are designed and constructed to provide for the release of the latch within the range required for the mower or other machine to which it is to be applied. Adjustments to meet varying conditions can then be made by sliding the clamping sleeve 45 along the finger assembly to increase or decrease the length of the free flexing portions of the fingers. Thus, as the clamp is moved toward the sleeve 28, the resistance of the fingers to transverse deflection is increased and such resistance decreases as the clamp is moved back. Accordingly, the latch may be set to release when the drag load on the cutter bar assembly exceeds any preselected value.

While the stationary mounting of the grooved latch element and the assembly of the flexible latch fingers with the pull bar presents advantages in the organization above described, it will be appreciated that the mounting of those elements may be reversed if desired. Tension mechanism employing such a reverse arrangement of the latch elements is shown in the modified form of the invention illustrated in Figs. 5–7. In that mechanism the pull bar 26 is slidable in an elongated tubular member or sleeve 50 supported for universal pivotal movement by a bracket 51 mounted on the frame member 14 by a ball and pin connection similar to that above described. At its forward end, the sleeve 50 has a threaded connection 52 with the bracket 51 to restrain it against endwise movement. A portion of this sleeve extends rearwardly of the bracket and is slotted longitudinally to define a group of elongated flexible fingers 53 disposed around the rod in a circular pattern, and, in this instance, uniformly spaced apart. The end portions of the fingers may be reduced progressively in thickness to afford greater resiliency.

Adjacent their free ends, fingers 53 are formed with inwardly projecting enlargements or lugs 54 of segmental cross section adapted to engage in a circumferential groove 55 in a companion latch element 56. The latter, as shown in Figs. 5 and 7, comprises a sleeve-like cylindrical member having a central bore for the reception of the pull bar 26. The member is rigidly anchored to the pull bar as by pins 57.

With the latch lugs 54 engaged in the groove 55 axial movement of the pull bar relative to the sleeve 51 is resisted by a force determined by the resiliency of the fingers 53 and the particular shaping of the latch lugs and the groove. It will be observed that those elements are formed to define coacting cam surfaces inclined at an angle to the axis of the bar so that the lugs can slide out of the groove when sufficient force is applied to the bar. To afford a range of adjustment, provision is made for varying the effective lengths of the fingers 53. To this end, the fingers are encircled by a collar 58 dimensioned to snugly embrace them adjacent their base portions. To facilitate adjustment and to retain the collar in adjusted position, a headed screw 59 is inserted through an aperture in the collar and threaded into a lug 60 integral with the sleeve 51. As shown, the collar is confined between the head of the screw and a nut 61 threaded thereon. A lock nut 62 threaded on the screw and engageable with the face of the lug 60 locks the parts in adjusted position.

To permit re-engagement of the latch by a simple forward movement of the pull bar 26, sleeve element 56 is formed at its forward end with a tapered nose portion 63. Accordingly, as the bar advances from the position shown in Fig. 7, the fingers ride over the nose portion until they drop into the notches 55 and re-establish the latched condition of the pull bar.

It will be evident that the latch mechanisms above described will effectively resist movement of the pull bar or extension of the releasable tension mechanism as long as the pulling force does not exceed a predetermined safe value. When the safe value is exceeded as when the cutter bar strikes an obstruction, the lugs on the resilient fingers are drawn from the notches in which they normally engage as the fingers flex outwardly, thus freeing the pull bar for rearward movement with the cutter bar assembly to which it is attached. Re-engagement of the latch is effected by simply shifting the pull bar forwardly to again engage the latch lugs in the latching groove.

The improved tension mechanism utilizes a pull bar and latch mechanism made up of simple, easily formed parts that can be produced by low cost manufacturing methods. Moreover, the latch mechanism is readily adjustable to provide for release when subjected to drag loads within a relatively wide range, thus adapting it for use under a variety of conditions and with various types of implements or machines.

I claim as my invention:

1. A releasable tension mechanism for a mower or the like having one part mounted to swing about a pivot relative to another part, said mechanism comprising, in combination, a pull bar having means at one end for connection with the swingable part of the mower, a guide sleeve element slidably receiving said bar and having means for connection with the other part of the mower, a latch element fixed to and movable with said bar, one of said elements having a circumferential groove and the other element having a series of resilient fingers equipped with lugs engageable in said groove to latch the parts together, said fingers yielding to permit withdrawal of the lugs from the groove upon imposition of a predetermined drag load on said bar.

2. An extensible tension mechanism comprising an elongated bar, a sleeve element slidably receiving said bar, said sleeve element having an outwardly facing circumferential groove, a plurality of resilient fingers arranged around said bar and each anchored thereto adjacent one end, lugs on the free ends of said fingers engageable in said groove to latch the bar against endwise movement relative to the sleeve, said fingers yielding to permit withdrawal of said lugs from the groove when a predetermined tension load is applied to said bar.

3. A releasable pull bar assembly comprising, in combination, an elongated pull bar, a sleeve element slidably receiving said bar, a group of elongated resilient fingers assembled in a circular series coaxially of the bar with the fingers disposed generally parallel to the longitudinal axis of the bar, said fingers being anchored at one of their ends to the bar leaving their other ends free to flex transversely of the bar and to telescope over said sleeve element, and interengaging means on said fingers and said sleeve element releasably latching the bar and sleeve against relative movement, the resiliency of said fingers being effective to hold said latching means in interengaging relation while permitting disengagement when the force tending to move the bar relative to the sleeve element exceeds a predetermined value.

4. A releasable tension mechanism comprising, in combination, an elongated pull bar adapted to be connected at one end to a rearwardly swingable cutter bar assembly of the mower for endwise movement in such swinging of the assembly, latch means operative to restrain the assembly from swinging until the drag load thereon exceeds a predetermined value, said latch means comprising relatively movable cooperating elements adapted to be respectively secured to said pull bar and to a stationary part of the mower, one of said elements comprising a sleeve disposed coaxially of the bar, the other of said elements comprising a group of elongated resilient fingers disposed in a circular pattern coaxial with the bar with the fingers extending generally parallel to the axis of the bar, and means restraining the fingers against movement transversely of the bar adjacent one of their ends and leaving the other end free to flex outwardly of the bar and to telescope over said sleeve, said fingers and said sleeves having interengaging lugs and grooves operative to releasably latch the elements together.

5. An extensible tension device comprising, in combination, an elongated bar, latch means operative to resist movement of said bar when subject to tensile forces below a predetermined value, said latch means comprising relatively movable cooperating latch elements respectively secured to said bar and to a fixed anchorage, one of said elements comprising a sleeve disposed coaxially of the bar, the other of said elements comprising a group of elongated resilient strips disposed in a circular pattern coaxial with the bar and with the strips extending generally parallel to the longitudinal axis of the bar, means adjacent one end of the group of strips restraining them against movement transversely of the bar and leaving the other ends of the strips free to flex and to telescope over one end of said sleeve, said fingers and said sleeve having means interengageable to releasably latch the elements together.

6. An extensible tension device comprising in combination, an elongated bar, latch means operative to resist movement of said bar when subject to tensile forces below a predetermined value, said latch means comprising relatively movable cooperating latch elements respectively secured to said bar and to a fixed anchorage, one of said elements comprising a sleeve disposed coaxially of the bar, the other of said elements comprising a group of elongated resilient strips disposed in a circular pattern coaxial with the bar and with the strips extending generally parallel to the longitudinal axis of the bar, means adjacent one end of the group of strips restraining them against movement transversely of the bar and leaving the other ends of the strips free to flex and to telescope over one end of said sleeve, said sleeve having an outwardly facing circumferential groove adjacent said one end, and inwardly projecting lugs adjacent the free ends of said strips engageable in said groove to releasably latch the elements together.

7. An extensible tension device comprising, in combination, an elongated bar, latch means operative to resist movement of said bar when subject to tensile forces below a predetermined value, said latch means comprising relatively movable cooperating latch elements respectively secured to said bar and to a fixed anchorage, one of said elements comprising a sleeve disposed coaxially of the bar, the other of said elements comprising a group of elongated resilient strips disposed in a circular pattern coaxial with the bar and with the strips extending generally parallel to the longitudinal axis of the bar, means adjacent one end of the group of strips restraining them against movement transversely of the bar and leaving the other ends of the strips free to flex and to telescope over one end of said sleeve, said sleeve having a circumferential groove presenting a cam surface inclined to the axis of the bar, and an enlargement adjacent the free end of each strip engageable in said groove to latch the elements together, said enlargement presenting a cam surface in opposed relation to said first mentioned cam surface and adapted to ride over it and release the elements when the tensile force applied to said bar exceeds a predetermined value.

References Cited in the file of this patent

UNITED STATES PATENTS

| | | |
|---|---|---|
| 1,448,058 | Eis et al. | Mar. 13, 1923 |
| 1,636,678 | Benson | July 26, 1927 |
| 2,000,363 | Thoen | May 7, 1935 |
| 2,354,710 | Simpson et al. | Aug. 1, 1944 |